United States Patent [19]

Yugami et al.

[11] Patent Number: 5,468,282
[45] Date of Patent: Nov. 21, 1995

[54] METHOD FOR OPERATING A FILTRATION APPARATUS FOR FLUE GAS

[75] Inventors: Hiroshi Yugami, Yachimata; Minoru Yamada, Tokorozawa; Noriyuki Oda; Yasuhiko Endo, both of Tokyo, all of Japan

[73] Assignee: Asahi Glass Company Ltd., Tokyo, Japan

[21] Appl. No.: 198,261

[22] Filed: Feb. 18, 1994

[30] Foreign Application Priority Data

Feb. 18, 1993 [JP] Japan ................... 5-052919

[51] Int. Cl.⁶ ............................................. B01D 46/00
[52] U.S. Cl. .................................. 95/8; 55/262; 55/338; 55/523; 95/14; 95/280
[58] Field of Search ................... 55/262, 279, 302, 55/338, 339, 341.1, 341.2, 523; 95/8, 14, 273, 280, 291

[56] References Cited

U.S. PATENT DOCUMENTS

| | | | |
|---|---|---|---|
| 3,267,649 | 8/1966 | Vicard | 55/338 |
| 3,731,910 | 5/1973 | Butler | 55/262 |
| 3,993,460 | 11/1976 | Gooch et al. | 55/270 |
| 4,083,701 | 4/1978 | Noack | 95/14 |
| 4,584,003 | 4/1986 | Oda et al. | 55/269 |
| 5,078,760 | 1/1992 | Haldipur et al. | 55/302 |
| 5,094,673 | 3/1992 | Kilicaslan et al. | 55/302 |
| 5,348,568 | 9/1994 | Oda et al. | 95/14 |

FOREIGN PATENT DOCUMENTS

| | | |
|---|---|---|
| 0554886 | 8/1993 | European Pat. Off. |
| 52-57078 | 5/1977 | Japan ................... 95/14 |
| 55-73313 | 6/1980 | Japan ................... 55/262 |
| 56-158127 | 12/1981 | Japan ................... 95/8 |
| 59-179131 | 10/1984 | Japan ................... 95/8 |
| 60-12885 | 4/1985 | Japan ................... 55/262 |
| 3-24251 | 4/1991 | Japan . |

OTHER PUBLICATIONS

Bureau of Mines Open File Report 67–83, A minerals research contract report, R. H. Essenhigh, et al., "Coal Dust combustion in a Stirred Reactor: Evaluation of Combustion and Extiction Mechanisms in Coal Dust Explosion Flames", pp. 1–71, Oct. 1981.

R–D Kobe Steel, vol. 33, No. 3, Kotaro Morimoto, et al., "Laboratory Measurement and Calculation of Minimum Explosible Concentration of Coal Dust Clouds", pp. 73–76.

Nippon Kogyo Kaishi, vol. 99, No. 1148, Enomoto, et al., pp. 899–904, 1983.

Patent Abstracts of Japan, vol. 8, No. 130 (C–229) (1567), Jun. 16, 1984, JP–A–59–41407, Mar. 7, 1984.

Patent Abstracts of Japan, vol. 4, No. 140 (C–26)(622), Oct. 3, 1980, JP–A–55–88820, Jul. 4, 1980.

*Primary Examiner*—C. Scott Bushey
*Attorney, Agent, or Firm*—Oblon, Spivak, McClelland, Maier & Neustadt

[57] ABSTRACT

A method for operating a filtration apparatus for flue gas, which removes dust from flue gas discharged from a burner using mainly solid fuel, wherein incombustible powder is introduced into the filtration apparatus upon detecting or foreseeing coming of unburnt combustible dust from the burner, or upon detecting or foreseeing a temperature rise of the flue gas, and the incombustible powder is suspended in the dust-containing flue gas to suppress combustion of the combustible dust, or to suppress the temperature rise of the flue gas, in the filtration apparatus.

12 Claims, 6 Drawing Sheets

METHOD FOR OPERATING A FILTRATION APPARATUS FOR FLUE GAS

BACKGROUND OF THE INVENTION

Field of the Invention

The present invention relates to a method for operating a filtration apparatus for flue gas, which entails removing dust from flue gas discharged from a burner such as a refuse incinerator or a burner operated under pressure such as a pressurized fluidized bed combustion boiler (hereinafter referred to simple as a PFBC boiler) or a coal direct firing burner using mainly solid fuel such as coal, by means of a filtration apparatus such as a filtration apparatus equipped with ceramics filters, a louver separator, a cyclone separator, a multi-cyclone separator or a combination thereof, whereby a trouble such that flue gas containing a large amount of unburnt combustible dust is discharged by temporary incomplete combustion and the combustible dust introduced into the filtration apparatus catches fire, or such that high temperature flue gas is introduced due to temporary abnormal combustion and the filtration apparatus is thereby thermally damaged, is prevented.

Description of the Background

A filtration apparatus equipped with ceramics filters is considered to be a key component for a power plant operated by a PFBC boiler or for a coal-gasification apparatus as a clean energy technology (with reduced amounts of $NO_x$ and $SO_x$) of next generation using abundantly deposited coal as the fuel. Accordingly, many attempts are being made for practical use of such a filtration apparatus in various countries in the world. In particular, the power plant operated by a PFBC boiler is expected to be developed for practical use in the nearest future because of simplicity of the system.

For the burner of this type using mainly solid fuel, it is common to use e.g. natural gas, light oil, kerosine, rice hull, straw, wood or paper, as a starting fuel or auxiliary fuel. Incomplete combustion of solid fuel is likely to result when mixed fuels are burnt or when the load during the combustion of solid fuel increases. It has been found that in such a case, a large amount of unburnt combustible dust is discharged together with flue gas, and if the oxygen concentration in the flue gas increases, spontaneous combustion of the combustible dust occurs in the piping, in a cyclone as a preliminary rough filtration apparatus or in a filtration apparatus equipped with ceramics filters connected to the downstream of the cyclone, whereby a trouble such as thermal damage of the piping or parts such as the ceramic filters, will be brought about.

In the case of the PFBC boiler, the burner of the boiler is pre-heated at the initiation of the operation by burning e.g. kerosine until the interior of the burner will reach a predetermined temperature and pressure, and then introduction of coal is initiated. After a certain period of burning mixed fuels, the fueling system is switched to exclusively coal. During such a transition period, a change in the amount of coal supplied or clogging of the coal supply tube is likely to occur in the coal supply system, and the oxygen concentration and the combustion temperature tend to be unstable, whereby depending upon the construction of the automatic control system, it may happen that the amount of coal supplied abnormally changes in response to such phenomena.

In such a situation, it is likely that supply of coal will be continued despite the interior of the burner of the boiler is in an extinguished state, and such coal will be sent to the cyclone as the preliminary rough filtration apparatus or to the filtration apparatus equipped with ceramic filters, connected to the downstream of the cyclone, whereupon unburnt combustible dust will stay in the interior of such a filtration apparatus. Such combustible dust will be ignited and will vigorously burn if the oxygen concentration in the dust-containing gas increases.

If the fuel burns in the cyclone or at the upper space in the boiler instead of in the burner, the temperature of flue gas to be introduced into the filtration apparatus located downstream, will sharply increase, whereupon the temperature difference between the interior and the exterior of the ceramics filters increases beyond the temperature difference acceptable to the filters, whereby the ceramic filters will be damaged by the thermal stress.

If the oxygen concentration in the filtration apparatus is higher than the oxygen concentration in the burner of the boiler, it may happen that the dust-containing gas which contains unburnt combustible dust, will be ignited and will burn as soon as it reaches the filtration apparatus. Combustion of such dust may sometimes slowly take place on the filter walls, or may sometimes explosively take place if unburnt combustible dust is contained in the surrounding dust-containing atmosphere. In either case, the parts such as lining and ceramic filters in the interior of the filtration apparatus will be over-heated, and in the latter case, the ceramic filters are likely to be broken by the thermal stress.

The increase of the oxygen concentration may occur not only by instable combustion in the burner, but also by the extinction of the kerosine burner or by fuel tripping. In such a transition state, the oxygen concentration may substantially vary also depending upon the position in the filtration apparatus.

Further, with a PFBC boiler, it is likely that fueling is soon switched from kerosine combustion to coal combustion. With a view to improving the thermal efficiency of the entire plant, this should be desirable. However, possibly due to post bed combustion of the introduced coal, an abrupt increase of the temperature of the flue gas in the filtration apparatus occurs from time to time, whereby various parts in the filtration apparatus will be thermal damaged.

If the dust-containing gas is returned from the downstream (hopper) of the filtration apparatus to the upper stream (gas inlet port) as in the case of the filtration apparatus disclosed in Japanese Examined Patent Publication No. 24251/1991, nowhere in the space on the dust-containing gas side in the filtration apparatus the flow of the dust-containing gas will be stagnant, and the mean build up accumulation amount of dust captured by the ceramic filters can be remarkably reduced. Thus, ignition and combustion of the dust containing unburnt combustible dust will be suppressed. So long as the amount of dust captured by the ceramic filters is small, even if combustion takes place, such combustion will not be vigorous. However, even if such a construction is adopted, it is still difficult to certainly avoid the possibility that in a certain space within the filtration apparatus, the dust containing combustion powdery dust undergoes combustion explosively to thermally damage various parts of the filtration apparatus.

Heretofore, with e.g. a circulatory fluidized bed combustion boiler wherein combustion takes place under a pressure around atmospheric pressure, combustion of dust containing unburnt combustible powdery dust coming to e.g. a cyclone has sometimes happened, and some cases have been reported wherein parts or linings in the cyclone have been thermally damaged. However, there has been no report on the mechanism of this combustion. Further, with respect to removal of dust from flue gas of a PFBC boiler, even the existence of such a problem has not been reported.

With respect to coal-dust explosion, it is known that combustible powdery dust suspended in a gas containing oxygen undergoes abrupt combustion or explosion by an uncertain cause, when the combustible powdery dust is at a concentration within a certain specific range. It is known that when coal-dust and incombustible powdery dust are mixed and suspended in atmospheric air at room temperature under atmospheric pressure, there is a certain range wherein no such abrupt combustion will take place depending upon the conditions such as the particle sizes of coal-dust and incombustible powdery dust, the proportions of the two dusts and the total dust content of the two dusts (e.g. Heiji Enomoto et al, Journal of Nippon Kogyo kai, Vol. 99, No. 1148, p899, 1983).

Further, in the case of coal-dust, it is known that when the atmospheric temperature is raised from room temperature to 120° C., the lower limit of the range of concentration for coal-dust explosion will expand (Kotaro Morimoto et al, R-D Kobe Steel Technical Report, Vol. 33, NO. 3). Furthermore, it is known that combustion can be suppressed and extinguished when a mixture of fine coal powder and incombustible powder is blown into a furnace which is operated by introducing fine coal powder by a jet air stream and burning it (R. H. Essnenhigh, Bureau of Mines Open File Report 67, 1983).

However, no report is presently available with respect to the range for explosion of combustible powdery dust under a pressurized atmospheric condition (particularly under 3 atm or higher) at a temperature above 300° C. Likewise, no report is available with respect to ignition and abrupt combustion of combustible powdery dust suspended in a filtration apparatus for dust removal treatment of flue gas discharged from e.g. a PFBC boiler, and accordingly, no report is available on a method of preventing such abrupt combustion.

SUMMARY OF THE INVENTION

In view of the above described problems of the prior art, it is an object of the present invention to provide a method for operating a filtration apparatus, wherein a filtration apparatus equipped with ceramic filters, a louver separator, a cyclone separator, a multi-cyclone separator or a combination thereof, is used as the filtration apparatus to remove dust of flue gas discharged from a burner such as a PFBC boiler or a coal direct firing burner, or from a burner such as a refuse incinerator, whereby a trouble can be prevented even when a dust-containing gas containing a large amount of unburnt combustible powdery dust is discharged into the flue gas or even when the temperature of the flue gas increases abruptly.

BRIEF DESCRIPTION OF THE DRAWINGS

FIG. 2 (b) is a graph showing the descending velocity and the dust concentration of the dust-containing gas at the corresponding height in the filter tubes 3.

DETAILED DESCRIPTION OF THE PREFERRED EMBODIMENTS

The present invention has been made to accomplish the above object and provides a method for operating a filtration apparatus for flue gas, which comprises removing dust from flue gas discharged from a burner using mainly solid fuel, wherein incombustible powder is introduced into the filtration apparatus upon detecting or foreseeing coming of unburnt combustible dust from the burner, or upon detecting or foreseeing a temperature rise of the flue gas, and the incombustible powder is suspended in the dust-containing flue gas to suppress combustion of the combustible dust, or to suppress the temperature rise of the flue gas, in the filtration apparatus.

The present inventors have noticed that even under a pressurized condition at a high temperature, if combustible powdery dust and incombustible powder are suspended in a mixed state in a gas containing oxygen, the range in which no abrupt combustion takes place, will expand depending upon conditions such as the ratio of the two powdery materials, the mean particles sizes of the combustible powdery dust particles and incombustible powder particles, the total dust concentration of the two powdery materials and the oxygen partial pressure. This has been confirmed by experiments which will be described hereinafter. Thus, the present invention has been accomplished.

Namely, in the method for operating a filtration apparatus for flue gas according to the present invention, incombustible powder is introduced into the filtration apparatus or into the upper stream of the filtration apparatus to suspend it in the dust-containing gas in the filtration apparatus, whereby the abrupt increase of the gas temperature in the upper stream of the plant can be moderated, and propagation of flames among combustible powdery dust particles can be suppressed when the combustible powdery dust was introduced into the filtration apparatus, and ignition can be prevented, or even if ignition and combustion occur, such can be suppressed to a mild and small scale combustion.

Figure 1:
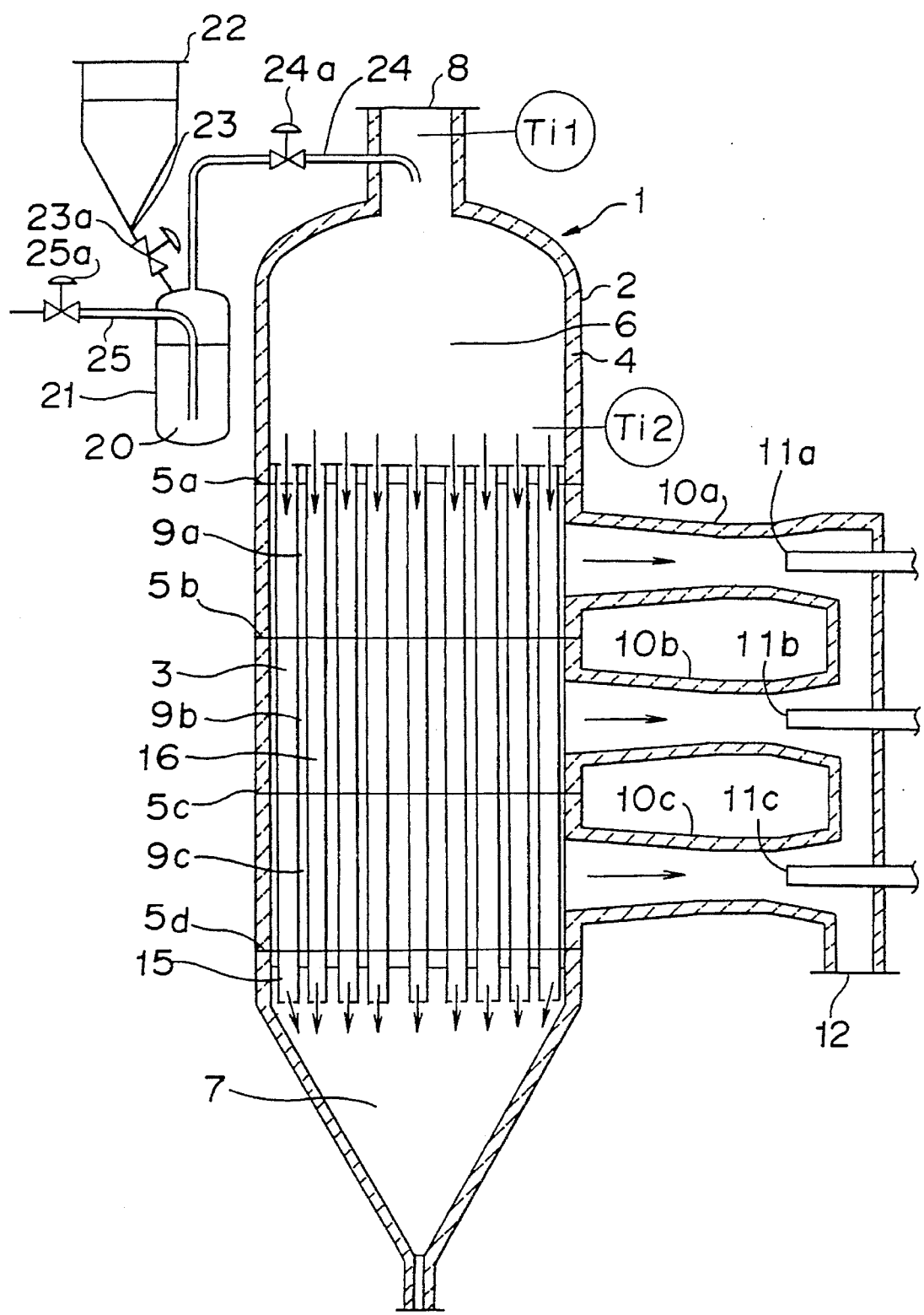
FIG. 1 is a vertical cross-sectional view of an embodiment of the present invention.

In the accompanying drawings:

FIG. 1 is a vertical cross-sectional view illustrating an embodiment wherein the method for operating a filtration apparatus for flue gas according to the present invention, is applied to a tubular filtration apparatus for removing dust from flue gas of a PFBC boiler.

Figure 2A:
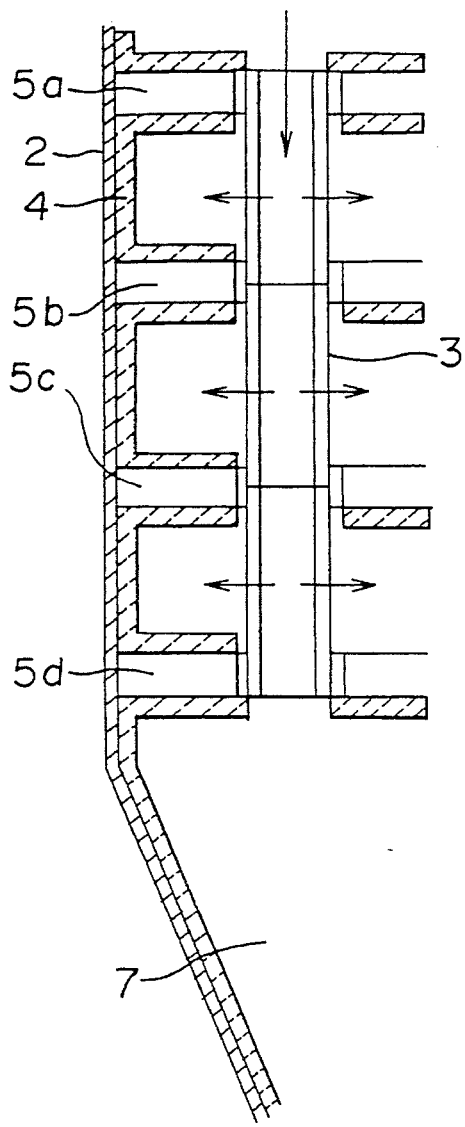
FIG. 2 (a) is a vertical cross-sectional view showing a part of FIG. 1.

FIG. 2(a) is a vertical cross-sectional view showing a part of FIG. 1.

Figure 2B:
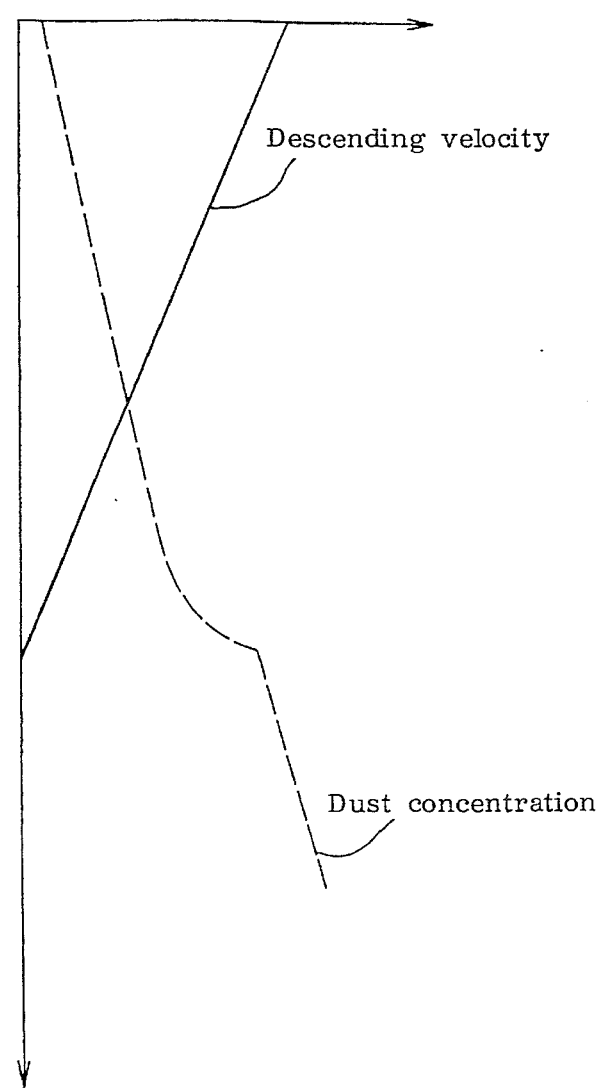

FIG. 2(b) is a graph showing the descending velocity and the dust concentration of the dust-containing gas at the corresponding height in the filter tubes 3.

Figure 3:
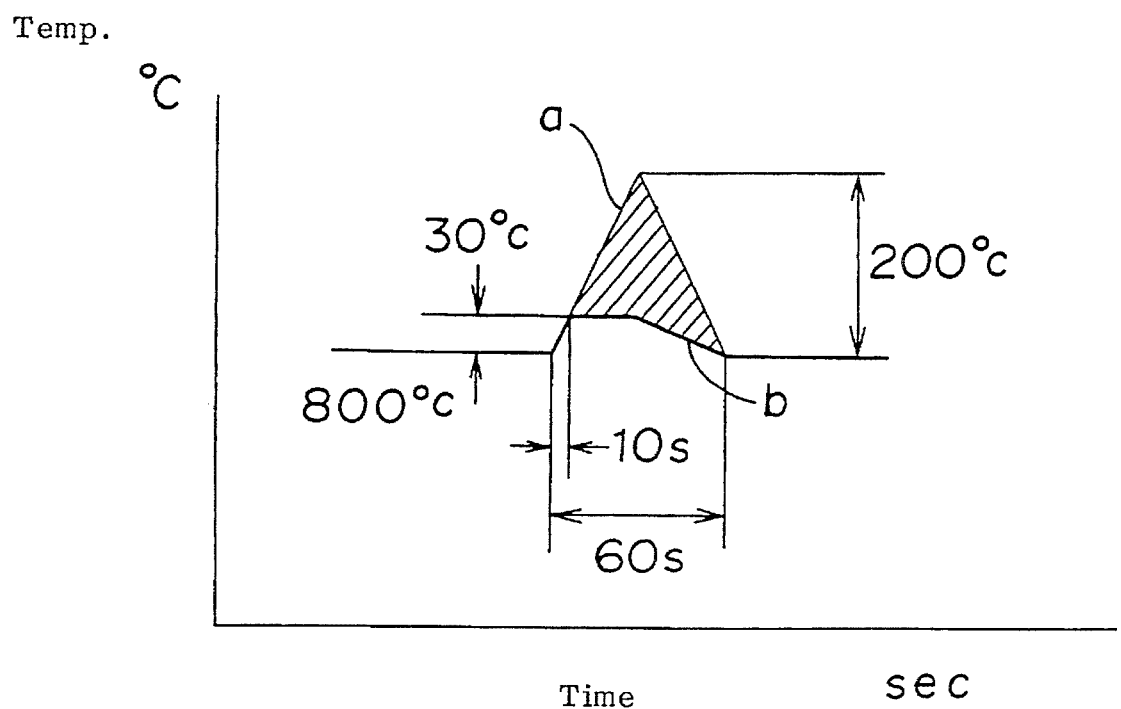
FIG. 3 is a graph showing typical patterns of the temperature changes in filtration apparatus in two cases, i.e., are with and the other without the present invention.

FIG. 3 is a graph showing typical patterns of the temperature changes in filtration apparatus in two cases i.e. one case where the method for operating a filtration apparatus for flue gas according to the present invention is applied and the other case where no such a method is applied.

Figure 4:
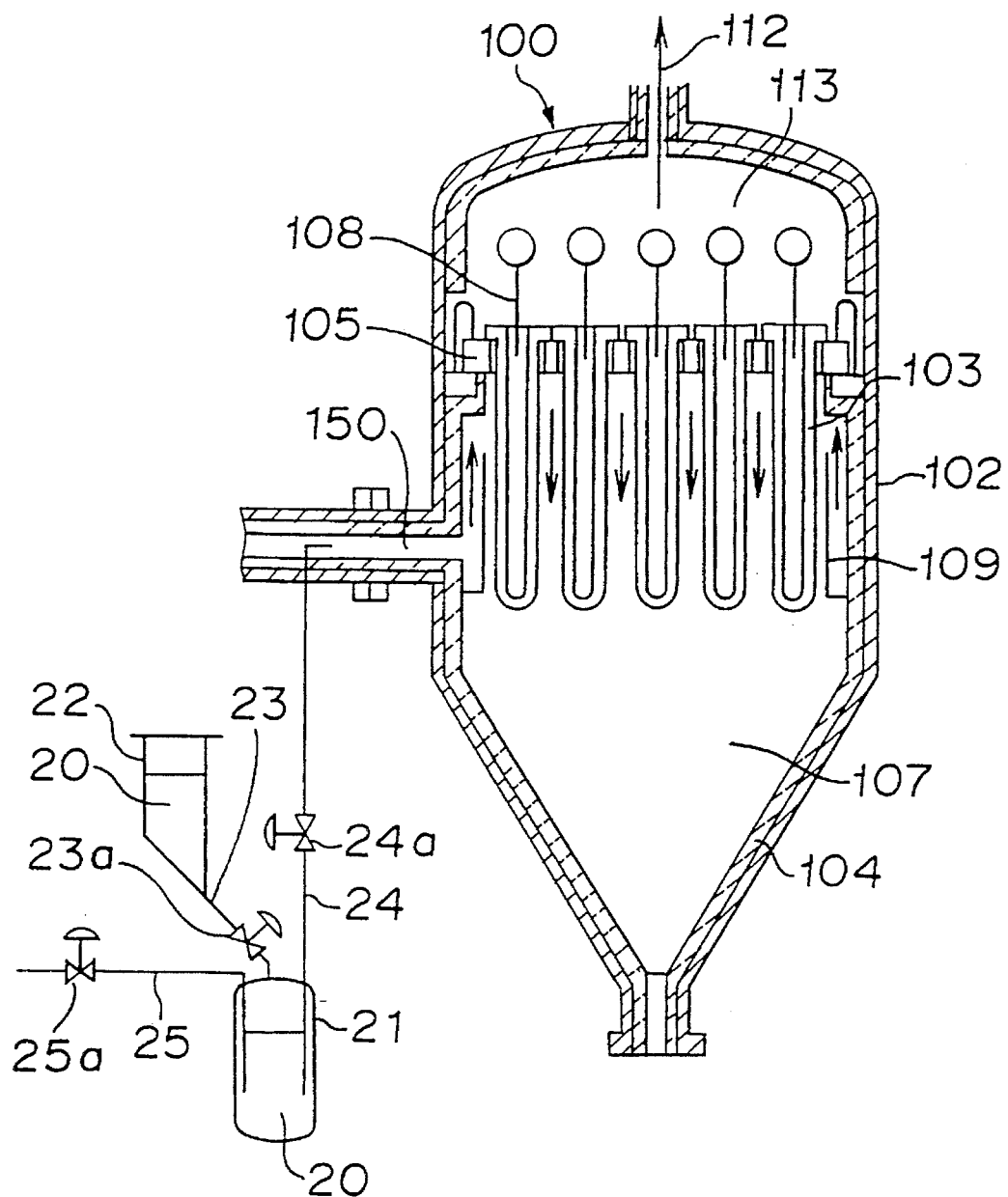
FIG. 4 is a vertical cross-sectional view illustrating an embodiment of the present invention.

FIG. 4 is a vertical cross-sectional view illustrating a typical construction of a filtration apparatus in a case where the method for operating a filtration apparatus according to the present invention is applied to a candle type filtration apparatus for removing dust from flue gas.

Figure 5:
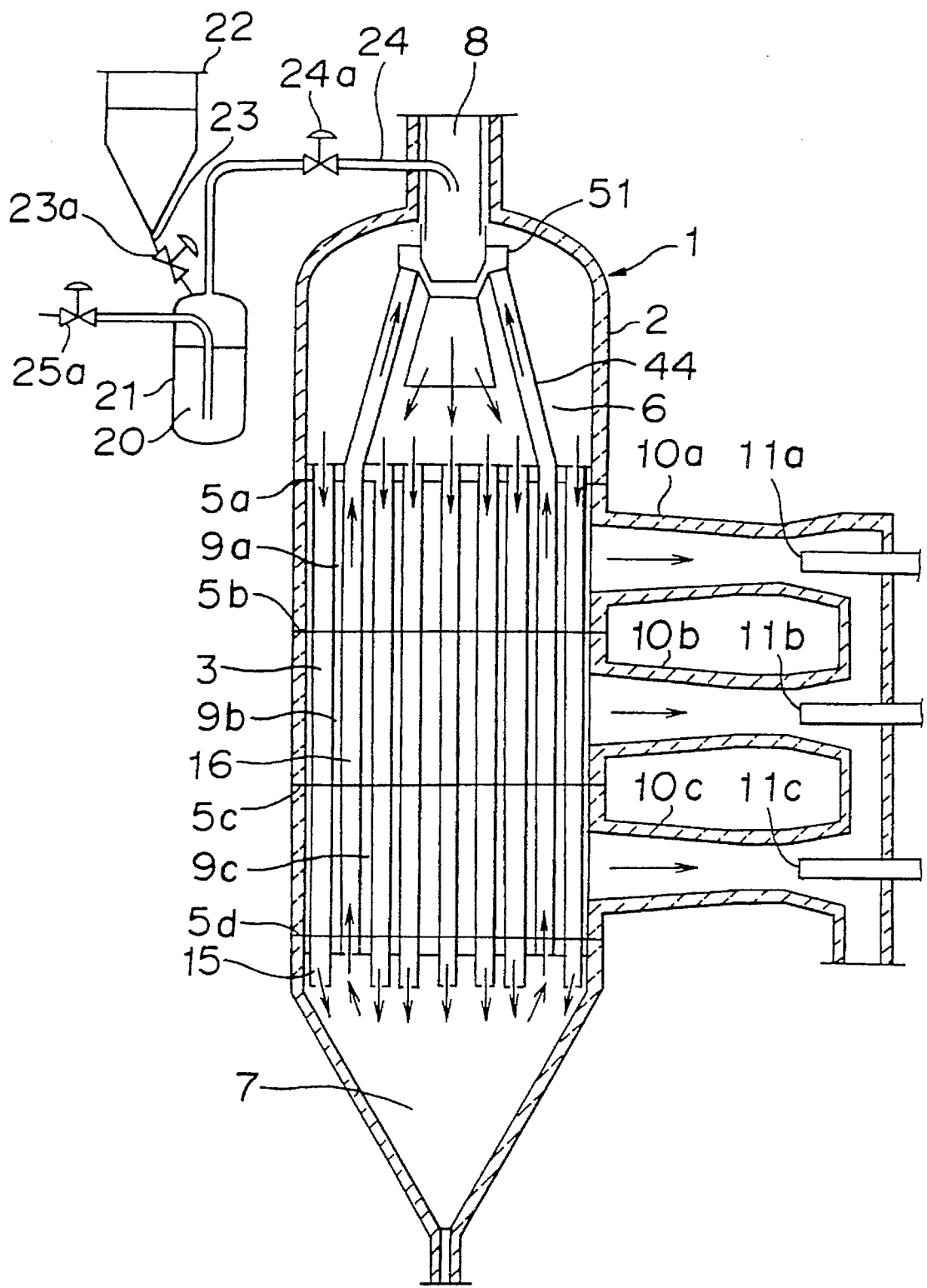
FIG. 5 is a vertical cross-sectional view of an embodiment of the present invention.

FIG. 5 is a vertical cross-sectional view illustrating an embodiment wherein the method for operating a filtration apparatus for flue gas according to the present invention is applied to a tubular type filtration apparatus (provided with a means for returning the dust-containing gas) for removing dust from flue gas of a PFBC boiler.

Figure 6:
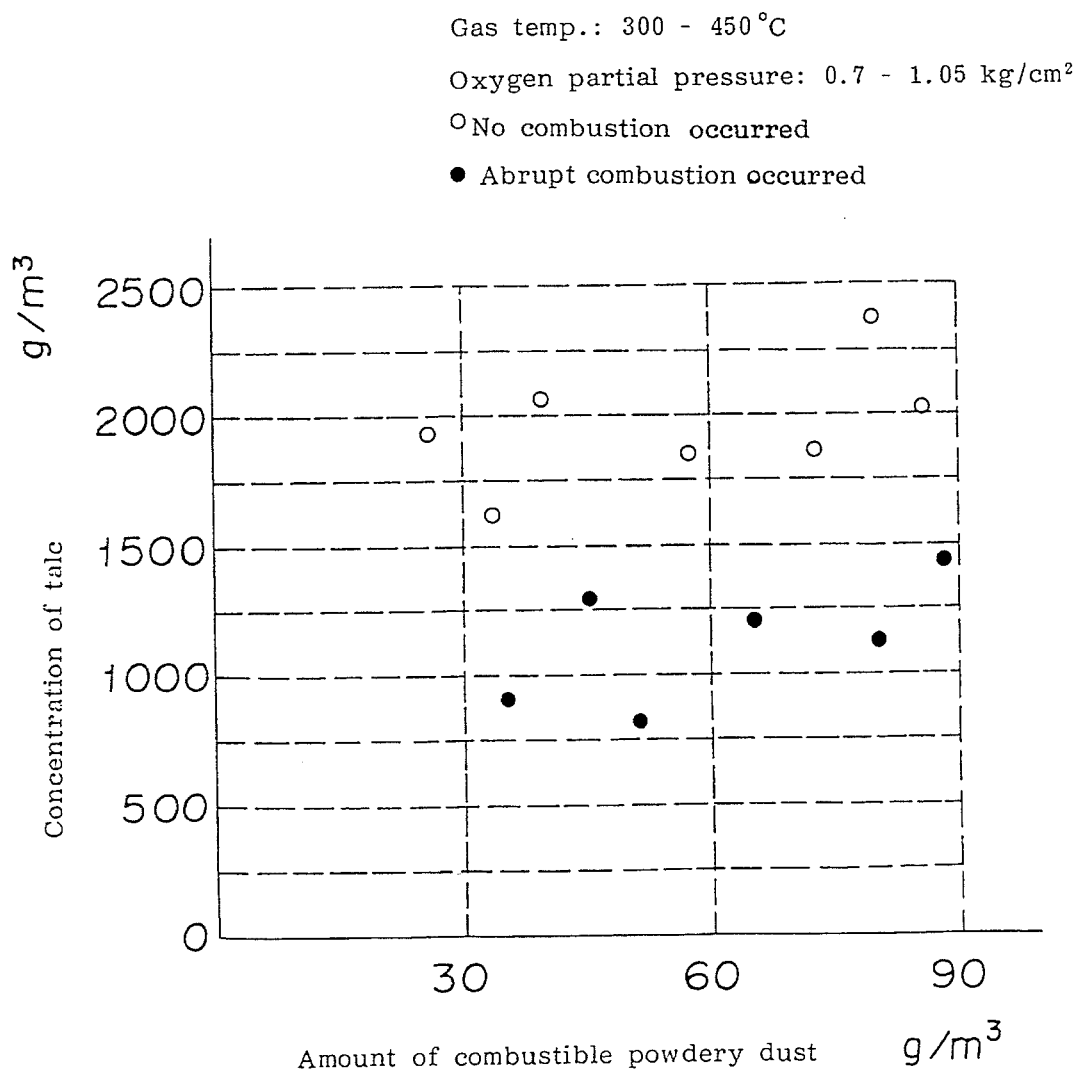
FIG. 6 is graph showing the effects of present method.

FIG. 6 is a graph showing the effects of the method of the present invention, which shows the results of the operation of a filtration apparatus in which combustible powdery dust (coal-dust and char) was intentionally produced at the time of removing dust from flue gas of a PFBC boiler.

Now, the present invention will be described in detail with reference to the preferred embodiments.

The detection of coming of unburnt combustible dust can be carried out by e.g. a carbon monoxide concentration meter for detecting an increase of concentration of carbon monoxide accompanying the combustible powdery dust, an oxygen concentration meter for detecting a change in the oxygen concentration which sharply decreases when unburnt combustible powdery dust has come, a dust concentration meter such as a photosensor for detecting the concentration of the dust coming to the filtration apparatus, a pressure difference meter for detecting an increase of the increment gradient of the filtration pressure difference of the filters due to an increase of the coming dust, or a thermometer for detecting a rise in the gas temperature upon combustion of the dust captured by e.g. filters.

Further, if conditions under which unburnt combustible powdery dust comes and is ignited, are known, it is possible to foresee the coming of such unburnt combustible powdery dust. For example, in the case of a PFBC boiler, such conditions may be during the period of mixed combustion of the solid fuel and a starting fuel or auxiliary fuel, during the period of shutting off the supply of fuel, during the increase or decrease of the load of the boiler, or immediately before or immediately after the increase or decrease of the load of the boiler. During the combustion of solid fuel such as coal, as the sole fuel, it is likely that when the supply of the fuel is abruptly shut off for some reason, the oxygen concentration in the fuel gas will increase sharply, and unburnt combustible powdery dust remaining in the filtration apparatus will start to burn rapidly, whereupon parts such as linings, ceramics filters, etc in the filtration apparatus will be over-heated and damaged.

In the case of a powder plant operated by a PFBC boiler, if the load to the boiler increases abruptly (for example, at least 3%/min), the supply of necessary air to the boiler tends to be delayed, since a large air tank is present between the boiler and the compressor directly connected to the gas turbine, whereby a large amount of unburnt combustible powdery dust will be discharged into flue gas. On the other hand, if the load decreases abruptly (for example, at least 5%/min), there will be a delay until the supply of air to the boiler starts to decrease because of the presence of the large air tank, whereby there will be the same condition as in the case of abrupt shutting off of the fuel.

In a preferred method for operating a filtration apparatus for flue gas according to the present invention, the incombustible powder to be introduced, is at least one member selected from the group consisting of calcium carbonate, calcium hydroxide, calcium sulfate, magnesium carbonate, magnesium hydroxide, magnesia, aluminum hydroxide, alumina, talc, clay, gypsum ($CaSO_4 \cdot 2H_2O$), ammonium phosphate, ammonium hydrogenphosphate, calcium hydrogenphosphate, boric acid, melamine phosphate, fly ash and diatomaceous earth. By introducing such incombustible powder to the filtration apparatus, it is possible to prevent ignition and combustion of the combustible powdery dust with a relatively small amount of the incombustible powder introduced.

When the filtration apparatus is a filtration apparatus equipped with ceramics filters, talc is preferred as the incombustible powder, since it does not substantially increase the pressure difference (since the shape of the particles is scaly, back-washing efficiency is good, whereby the filtration pressure difference may rather be decreased), and it is inexpensive. When the burner is a PFBC boiler, lime stone ($CaCO_3$) is introduced into the boiler for desulfurization, and the powdery dust discharged from the boiler will therefore contain a calcium compound. Therefore, even if a powder of a calcium compound is introduced into the filtration apparatus, there will be no problem created in the treatment of the recovered dusty ash.

Fly ash i.e. dusty ash (powdery dust) withdrawn from the boiler or the filtration apparatus, is incombustible powder available most inexpensively at site, and brings about no problem in the treatment of the recovered dusty ash.

As incombustible powder which is effective for the prevention of ignition or combustion of unburnt combustible powdery dust in a relatively small amount, ammonium phosphate, ammonium hydrogenphosphate, melamine phosphate or boric acid may be mentioned. However, these powders undergo thermal decomposition when heated and thus are likely to form compounds having slightly low melting points, which are likely to clog pores of the ceramics filters. Therefore, they are not suitable for use in a filtration apparatus equipped with ceramic filters for the removal of dust of a high temperature gas.

Those which are effective for the prevention of ignition of unburnt combustible powdery dust in a small amount, are calcium hydrogenphosphate, calcium phosphate, magnesia, magnesium hydroxide and talc. These incombustible powders will not be converted to low melting points substances even when heated. Therefore, they are suitable for use for the operation of a filtration apparatus equipped with ceramic filters for the removal of dust under a high temperature pressurized condition. With respect to alumina, ammonium hydroxide, kaolin (a kind of clay) and diatomaceous earth, commercial powder products are available at low costs and the effects for preventing ignition and combustion are good.

A part of the incombustible powder suspended in the dust-containing gas introduced into the filtration apparatus, will accumulate on the filter surface or on parts such as the linings in the filtration apparatus together with unburnt combustible powdery dust in the flue gas. Even if the unburnt combustible powdery dust in the accumulated powdery dust, is ignited, the incombustible powder introduced and being present in the accumulated powdery dust, will prevent heat conduction and propagation of combustion, so that no such vigorous combustion as to thermally damage the parts such as the linings and ceramic filters in the filtration apparatus, will take place.

Especially, magnesium hydroxide, aluminum hydroxide, calcium hydroxide, magnesium carbonate, gypsum, ammonium phosphate, ammonium hydrogenphosphate, melamine phosphate and boric acid, which are heat-decomposable when heated, will absorb substantial amounts of heat during the process of their heat decomposition. Therefore, they are incombustible powders effective to reduce the temperature of a high temperature flue gas.

When heated at a temperature of 900° C. or higher, clay and talc will also be decomposed to release water of crystallization and thus absorb heat and prevent propagation of combustion. Even when dehydrated, their particles remain to have a scaly shape and thus will not clog pores of the filter. At a temperature of 900° C. or higher, lime releases $CO_2$ and is converted to CaO. It absorbs heat during the decomposition and thus likewise has cooling effects and combustion preventing effects.

In a case where the filtration apparatus is equipped with ceramics filters, the abrupt increase of the gas temperature at the inlet port of the filtration apparatus will also cause thermal damages to the ceramics filters. In such a case, calcium hydroxide, lime, magnesium carbonate, magnesium hydroxide, aluminum hydroxide, gypsum, ammonium phosphate, ammonium hydrogen-phosphate, melamine phosphate and boric acid, which have initiation temperatures of the endothermic reaction within the operational temperature range of the filtration apparatus to be used and which have large ability for heat absorption by the reactions and large heat capacities, are preferred as the incombustible powders which are useful for the method of the present invention.

The incombustible powder useful for the method for operating a filtration apparatus for flue gas according to the present invention is not limited to the above described powders. However, the incombustible powder should not be the one which is reactive with the parts such as the linings or filters in the filtration apparatus or which impairs the function of the filtration apparatus or which clogs the filter pores.

In another preferred method for operating a filtration apparatus for flue gas according to the present invention, the amount of the incombustible powder to be introduced for one introduction operation, is adjusted at a level of from 1500 to 5000 g per 1 $m^3$ of the space on the dust-containing gas side of the filtration apparatus. If the amount is less than 1500 g per 1 $m^3$ of the space on the dust-containing flue gas side in the filtration apparatus, the preventing effects against the ignition and combustion of unburnt combustible powdery dust tend to be small. On the other hand, if it exceeds 5000 g, the operational costs of the apparatus tend to be high, and the filtering capacity of the filtration apparatus for flue gas tends to decrease, and the amount of captured powdery dust to be disposed will increase, such being undesirable. More preferably, the amount of the incombustible power to be introduced for one operation is from 2000 to 4500 g per 1 $m^3$ of the space on the dust-containing gas side in the filtration apparatus.

In another preferred method for operating a filtration apparatus for flue gas according to the present invention, the mean particle size of the incombustible powder to be introduced, is from 2 to 44 μm. If the mean particle size of the incombustible powder is less than 2 μm, the powder tends to be bulky and difficult to handle, and it will be difficult to collect such a powder by a cyclone or by a louver separator. With a filtration apparatus equipped with ceramics filters, even if the dust is detached from the filters by back-washing, it hardly falls down into the hopper, and it tends to increase the filtration pressure difference of the filter, whereby the treating capacity of the filtration apparatus decreases, such being undesirable.

On the other hand, if the mean particle size is larger than 44 μm, the preventing effects against ignition and combustion of combustible powdery dust tend to be small, relative to the amount of the incombustible powder introduced. Taking the cost performance into consideration, a preferred range of the mean particle size of the incombustible powder is from 3 to 20 μm. For a filtration apparatus equipped with ceramics filters, this mean particle size of the incombustible powder is preferably not more than 10 μm, more preferably not more than 5 μm.

In the case of a filtration apparatus utilizing inertia, such as a louver separator, a cyclone separator or a multi-cyclone separator, the mean particle size of the incombustible powder introduced and suspended in the filtration apparatus, is preferably selected to be larger than the limiting particle size of from 5 to 20 μm to be captured by such a filtration apparatus, so that the incombustible powder will not flow out to the downstream of the plant. In the present invention, the mean particle size of the incombustible powder is a weight average particle size obtainable by a sedimentation analysis.

In another preferred method for operating a filtration apparatus for flue gas according to the present invention, a filtration apparatus having high filtering efficiency equipped with ceramics filters, is used as the filtration apparatus. When the method for operating a filtration apparatus for flue gas according to the present invention is applied to the filtration apparatus equipped with ceramics filters, it is possible to prevent a trouble such that unburnt combustible powdery dust is ignited and burnt in such a state as captured by the ceramics filters together with the dust contained in the flue gas at a location in the filtration apparatus where the dust-containing gas stream is stagnant and where the dust concentration is high, whereby the ceramics filters are thermally damaged in many cases, or broken by the thermal stress to such an extent that the operation can no longer be continued.

The ceramic filter may typically be a crossed-flow type filter having plate-like filters overlaid to form a dust-containing gas flow path and a cleaned gas flow path so that they cross each other, a tubular filter having both ends opened, or a tubular filter having one end closed. Particularly when the method of the present invention is applied to a tubular filtration apparatus equipped with tubular ceramics filters having both ends opened and having a dust-containing gas flow path inside of each tubular filter, remarkable effects for preventing ignition and combustion of combustible powdery dust can be obtained, and dust-capturing efficiency will be excellent.

In another preferred method for operating a filtration apparatus for flue gas according to the present invention, the filtration apparatus is a louver separator, a cyclone separator or a multi-cyclone separator. With such a filtration apparatus utilizing inertia, the particle size of the powdery dust which can be captured, is relatively large, and the range of dust concentration within which abrupt combustion propagation can take place when unburnt combustible powdery dust is contained, is relatively narrow as compared with the case of a filtration apparatus equipped with ceramics filters. Nevertheless, when incomplete combustion occurs, the dust concentration often falls within the range wherein abrupt combustion occurs, between the turning point of the gas stream and the outlet port of powdery dust, whereby the parts and linings of the filtration apparatus are likely to be thermally damaged by combustion.

The multi-cyclone separator has a portion where the dust-containing gas flow path is constricted, and the constricted portion of the flow path is likely to be clogged when the powdery dust is melted by combustion of the combustible powdery dust. Such a trouble can be avoided by applying the method for operating a filtration apparatus for flue gas according to the present invention.

In another preferred method for operating a filtration apparatus for flue gas according to the present invention, the operation to introduce and suspend the incombustible powder in the filtration apparatus, is carried out by injecting compressed air into incombustible powder put in a pressure vessel attached to the filtration apparatus. In the case of a filtration apparatus provided with a control system having e.g. a built-in computer, such an operation is carried out in accordance with a preliminarily set program., for example, by introducing incombustible powder into the system of the filtration apparatus immediately before the above mentioned abrupt shutting off of the fuel.

In the case of a filtration apparatus equipped with a ceramics filters and having a dead space at the gas inlet port or at the hopper of the filtration apparatus, the incombustible powder may be stored at the dead space, and compressed gas may be injected as the case requires.

With a burner of practical scale such as a PFBC boiler, the number of repetitions of initiation and termination is small, and it is usual to conduct the operation continuously for a long period of time under a constant load, whereby frequency for an abnormal operational situation is small. In such a case, it is uneconomical to provide a complicated system for introducing the incombustible powder, and it is preferred to employ the above system having a simple construction.

In another preferred method for operating a filtration apparatus for flue gas according to the present invention, a blow down operation is also conducted wherein the dust-containing gas is withdrawn from the downstream (for example, the hopper) in the filtration apparatus and returned to the upper stream (for example, the gas inlet port) of the filtration apparatus. By conducting this blow down operation in parallel, the treating ability of the filtration apparatus is improved, whereby the amount of accumulation of unburnt combustible powdery dust on the filtration surface of the ceramics filters will be less, and ignition will be less likely. Further, even if the combustible powdery dust is ignited and burnt, the heat generation is less, since the amount of the powdery dust to be burnt will be less. Thus, thermal damage of the ceramics filters can thereby be more certainly prevented.

Also in the case of a filtration apparatus utilizing inertia, the blow down operation is effective in that local accumulation of dust can be avoided, since a stagnant zone of the dust-containing gas can be eliminated, and even if combustion of combustible powdery dust takes place, such combustion will be slight and mild.

In another preferred method for operating a filtration apparatus for flue gas, the burner is a PFBC boiler. Social need for a power plant having a PFBC boiler incorporated, is substantial. However, the power plant of this system and the technology for its operation have not yet been fully established. Namely, a trouble has been reported such that within a filtration apparatus equipped with a cyclone or ceramics filters for removing dust from flue gas of the PFBC boiler, unburnt combustible powder dust is ignited and burnt to thermally damage the internal linings and parts such as the ceramics filters of the filtration apparatus. This hinders a practical application of the power plant operated by a PFBC boiler.

As a power plant having a PFBC boiler incorporated, a plant having both a cyclone and ceramics filters incorporated as filtration apparatus, is planned. If the method for operating a filtration apparatus for flue gas according to the present invention, is applied to these filtration apparatus, more stabilized operation of the filtration apparatus can be attained.

Now, the present invention will be described in further detail with reference to Examples. However, it should be understood that the present invention is by no means restricted by such specific Examples.

EXAMPLES

FIG. 1 is a vertical cross sectional view of a tubular type filtration apparatus having ceramics filters incorporated, which illustrates an embodiment of the method for operating a filtration apparatus for flue gas according to the present invention. In this filtration apparatus, tubular ceramics filters (hereinafter referred to as filter tubes) having both ends opened, are incorporated. The gas flows through filter tubes from the inside to the outside of the tubes, whereby filtration is carried out.

In FIG. 1, reference numeral 1 indicates a filtration apparatus having filtered gas chambers 9a, 9b and 9c of a three stage construction of upper, intermediate and lower stages, numeral 2 a pressure vessel, numeral 3 filter tubes, numeral 4 a heat insulating material lined on the inner wall of the pressure vessel, numerals 5a, 5b, 5c and 5d tube sheets for supporting the filter tubes and horizontally partitioning the interior of the pressure vessel, numeral 6 a gas inlet chamber designed to uniformly distribute the introduced dust-containing gas to the filter tubes, numeral 7 a hopper, numeral 8 a gas inlet port of the filtration apparatus 1, numerals 10a, 10b and 10c filtered gas outlet tubes serving also as diffusers for back-washing ejectors connected to the upper, intermediate and lower filtered gas chambers 9a, 9b and 9c, respectively, numerals 11a, 11b and 11c are back-washing nozzles ejecting compressed air for back washing, numeral 15 skirts attached to the lower ends of the filter tubes 3, numeral 20 incombustible powder put in a pressure vessel 21, numeral 22 a storage tank for the incombustible powder which is kept under atmospheric pressure, numeral 23 is a piping for supplying the powder from the storage tank 22 to the pressure vessel 21, to which a manually operable valve 23a is connected, numeral 24 is a tube for introducing the incombustible powder, to which a control valve 24a is connected, and numeral 25 a piping for compressed air, to which a control valve 25a is connected.

In FIG. 1, flue gas discharged from a PFBC boiler (not shown), is introduced from the gas inlet port 8 of the filtration apparatus 1 into the gas inlet chamber 6 and then distributed to the respective filter tubes 3. If the boiler is operated in a steady state, no introduction of the incombustible powder 20 into the filtration apparatus 1 is carried out. The dust-containing gas distributed to each filter tube, is filtered by the inner surface of the filter tube 3, as it flows down in the filter tube, and filtered gas enters into the filtered gas chambers 9a, 9b and 9c, then flows out from the filtrated gas outlet tubes 10a, 10b and 10c and joins together, whereupon the filtered gas is sent from the filtered gas outlet port 12 to the downstream of the plant.

As the flue gas from the PFBC boiler is supplied, the dust (mainly coal ash under a steady state) in the flue gas will accumulate on the inner surface of the filter tubes 3, whereby the filtration pressure difference between the gas inlet chamber and the filtered gas chamber starts to increase. When the filtration pressure difference has increased to a certain level, compressed air is ejected from the back-washing nozzles 11a, 11b and 11c usually at regular time intervals to sequentially carry out back-washing for the respective filtered gas chambers 9a, 9b and 9c to regenerate filter tubes 3 disposed in the respective filtered gas chambers and thereby to maintain the filtration pressure difference below a certain level.

FIG. 2(a) is a partial vertical cross-sectional view of the tubular filtration apparatus of FIG. 1, and FIG. 2(b) is a graph showing the descending velocity of the dust-containing gas and the dust concentration in the dust-containing gas at the corresponding positions in height. With this filtration apparatus, the gas permeates through the walls of the filter tubes 3 to the outside of the filter tubes, whereby the descending velocity gradually decreases downward and becomes to be substantially zero at the lower ends of the filter tubes 3.

On the other hand, the dust concentration in the dust-containing gas descending in the filter tubes 3, increases as the gas goes down and becomes to be highest at the position where the gas velocity is almost zero, and powdery dust accumulates in the maximum thickness on the inner wall surface of the filter tubes 3 at this position. If the static pressure distribution within the gas inlet chamber 6 is completely uniform and if there is no fluctuation in the gas pressure drop among the respective filter tubes 3, the descending velocity of the dust-containing gas will be zero at the lower end of every filter tube 3, and the powdery dust will fall down by gravity to the hopper 7 at the terminal velocity.

However, in reality, the descending velocities of the dust-containing gas in the respective filter tubes 3 are delicately different from one another. There may be a filter tube in which the dust-containing gas is still descending at its lower end, while there may be a filter tube in which the dust-containing gas is flowing backward i.e. upward. Fine powdery dust moves along the gas stream, and the state of the gas stream changes with time. The graph of FIG. 2(b) shows the descending velocity distribution and the dust concentration distribution of the dust-containing gas in an ideal state.

If the combustion state of the boiler is instable, and an abnormal combustion state occurs, a large amount of unburnt combustible powdery dust will be discharged into the flue gas. The unburnt combustible powdery dust usually has a large mean particle size and a high specific gravity and thus more readily falls into the hopper than ash as the combustion residue. However, if its absolute amount increases, the amount of fine combustible powdery dust correspondingly increases, and fine combustible powdery dust tends to stay in the vicinity of the lower end of each filter tube.

If the oxygen concentration in the filtration apparatus increases in such a state, combustible powdery dust in the thickly accumulated dust on the inner surface of the filter tubes 3 or in the space near the accumulated dust will be ignited, whereupon combustion will start. If such a state is maintained, abrupt combustion of the accumulated powdery dust layer and suspended combustible powdery dust will finally occur to thermally damage the filter tubes.

However, when the incombustible powder is present in an amount of more than a certain level in the powdery dust, this incombustible powder will hinder heat conduction and prevent propagation of flames, and even when the combustible powdery dust is ignited, combustion will not rapidly spread over a wide range, and no vigorous combustion will take place. In a PFBC boiler, combustible powdery dust is discharged during the period of mixed combustion of solid fuel (coal) and kerosine as the starting fuel, at the time of emergency shut down of the supply of the fuel and during the increase or decrease of the combustion load. Therefore, during the period of mixed combustion, immediately before the emergency shut down of the supply of the fuel and during the increase or decrease of the combustion load, the valve 25a and the valve 24a are opened, and e.g. calcium hydroxide powder having a mean particle size of about 3 μm is injected into the dust-containing gas stream at the gas inlet port 8, so that the mean concentration of the incombustible powder in the filtration apparatus 1 will be at least 1500 g/Nm$^3$.

The concentration of the incombustible powder effective for suppressing ignition and combustion of the combustible powdery dust varies depending upon the oxygen pressure, the ratio of the combustible powdery dust to the incombustible powder, the total dust concentration of both, the respective average particle sizes, the content of volatile components in the combustible powdery dust and the types and amounts of the coexisting combustible gasses, and it is preferably at least 2500 g/Nm$^3$, more preferably at least 3000 g/Nm$^3$.

For example, in the case of a tubular filtration apparatus for treating 300,000 Nm$^3$/hr of flue gas from a PFBC boiler, if the capacity of the space on the dust-containing gas side in the filtration apparatus is 80 m$^3$, in order to bring the mean concentration of the incombustible powder to a level of 3000 g/m$^3$ calcium hydroxide may be injected in an amount of 240 kg per one introduction operation (3000 g/m$^3$×80 m$^3$=240 kg).

Here, it is important that the mean average size of the incombustible powder to be introduced, should be at most 10 μm, more preferably at most 5 μm. When incombustible powder of such a mean particle size is introduced, the incombustible powder will stay mostly at the lower end portions of the filter tubes 3 where the concentration of the dust is high, whereby the concentration of the incombustible powder at these portions increases, so that ignition and combustion of the combustible powdery dust tend to more scarcely occur. Further, incombustible powder of not more than 10 μm tend to stay for a certain period in the vicinity of the lower end portions of the filter tubes 3 where the combustion is likely to occur. Therefore, if the incombustible powder is introduced once in an amount sufficient to be distributed throughout the filtration apparatus, the effects of the introduction of the incombustible powder will last for a while.

As mentioned above, with the PFBC boiler, it may happen that due to abnormal combustion of coal (such as combustion at the downstream of the boiler), flue gas temperature rises abruptly. The method for operating a filtration apparatus for flue gas according to the present invention, is effective for the prevention of thermal damage of the filtration apparatus also in such a case. Namely, referring to FIG. 1, when a gas temperature rise higher than the predetermined value within a predetermined time (for example, 30° C./10 sec) is detected by the thermometer Til provided at the gas inlet port 8, firstly the valve 25a is immediately fully opened, and then the valve 24a is fully opened. The incombustible powder will be injected together with compressed air to the gas inlet port 8 and will vigorously be mixed with the flue gas introduced at a high velocity, whereby the temperature of the flue gas will rapidly be lowered.

In such a case, the cooling state of the dust-containing gas is detected by thermometer Ti2 provided at a lower portion of the gas inlet chamber 6, and depending upon the cooling state, the opening degree of the valve 24a is adjusted to control the amount of the incombustible powder introduced. The cooling of flue gas is preferably carried out by heat absorption accompanied by the heat decomposition reaction of the incombustible powder and by an increase of the sensible heat of the incombustible powder. Calcium hydroxide is thermally decomposed at 580° C. under atmospheric pressure to from CaO (quick lime) and water, as follows:

$$Ca(OH)_2 \rightarrow CaO + H_2O - 351.9 \text{ kcal/kgCa(OH)}_2$$

The specific heat of calcium hydroxide is about 0.3 kcal/kg, and the specific heat of calcium oxide (at least 580° C.) is about 0.2 kcal/kg. Now, let us assume a case where a temperature change will occur in such a manner that the temperature of flue gas introduced into a filtration apparatus rises from 800° C. in a steady state by 200° C. in about 30 seconds and returns to 800° C. in the next 30 seconds.

FIG. 3 is a graph showing an example of a pattern of the temperature change in a filtration apparatus when the method for operating a filtration apparatus for flue gas according to the present invention, is applied. In FIG. 3, $\underline{a}$ is a pattern diagrammatically illustrating the temperature change of flue gas when no incombustible powder is introduced. When such a temperature change occurs in the flue gas, calcium hydroxide powder as incombustible powder is introduced to reduce the temperature change in the flue gas to a pattern shown by $\underline{b}$. The amount of calcium hydroxide required for reducing the temperature change of pattern $\underline{a}$ to pattern $\underline{b}$ will be approximately calculated.

Referring to FIG. 3, when a gas temperature rising pattern as shown by $\underline{a}$ has occurred, in order to control it to the temperature pattern as shown by $\underline{b}$, it is necessary to absorb from the gas a heat quantity corresponding to the area indicated by oblique lines. The heat quantity to be absorbed (Qc) corresponds to the area indicated by oblique lines, and when the flow rate of the flue gas is 300000 Nm³/hr and the specific heat of the flue gas is 0.33 kcal/Nm³, Qc will be as follows:

$$Qc = \frac{1}{2} \times (60 \times 200 - (30 - 10 + 60) \times 30) \times 0.33 \times 300000/3600 = 132000 \text{ kcal}$$

Accordingly, the amount of calcium hydroxide required (Wc) will be as follows:

$$Wc = 132000/(351.9 - 0.3 \times (580 - 20) + 0.2 \times (800 - 580)) = 234 \text{ kg}$$

Thus the amount of slaked lime required to be introduced during the temperature rising period of 60 seconds, will be 3.9 kg/sec on average.

Thus, it is possible to avoid the abrupt combustion of combustible powdery dust at the lower ends of the filter tubes, or the rapid rise of the inlet temperature, by introducing slaked lime powder in a relatively small amount as compared with the amount of the flue gas introduced, thereby it is able to avoid thermal damage of the filter tubes in the filtration apparatus.

The present invention is effectively applicable not only to the tubular filtration apparatus but also to filtration apparatus equipped with other types of ceramic filters. For example, FIG. 4 is a vertical cross-sectional view illustrating a structure of a filtration apparatus when the method for operating a filtration apparatus for flue gas according to the present invention, is applied to a candle type filtration apparatus.

Referring to FIG. 4, reference numeral 100 indicates a candle type filtration apparatus, numeral 102 a pressure vessel, numeral 104 a heat insulating material, numeral 103 a filter tube having one end closed, numeral 105 a tube sheet for hanging a plurality of filter tubes 103 and partitioning the dust-containing gas side space and the filtered gas side space, numeral 107 a hopper, numeral 108 a back-washing nozzle inserted into each filter tube, numeral 109 a guide cylinder designed to change the flow direction of the dust-containing gas introduced from the gas inlet port 150 to a downward flow along the filter tubes 103, numeral 112 a filtered gas outlet port, numeral 113 a filtered gas chamber, numeral 20 an incombustible powder put in a pressure vessel 21, numeral 22 a storage tank for the incombustible powder under atmospheric pressure, numeral 23 a piping for supplying the incombustible powder from the incombustible powder storage tank to the pressure vessel 21, to which a manually operable valve 23a is connected, numeral 24 a tube for introducing the incombustible powder, to which a control valve 24a is connected, and numeral 25 a piping for compressed air to which a compressed air control valve 25a is attached.

Referring to FIG. 4, flue gas from a PFBC boiler (not shown) is introduced into the filtration apparatus through the gas inlet port 150 and directed by the guide cylinder 109 upward as shown by an arrow. The flue gas thus reached to the upper ends of filter tubes 103, will then descend along the respective filter tubes 103. If the boiler is operated in a steady state, no introduction of the incombustible powder 20 into the flue gas is carried out.

The filtered clean gas rises in each filter tube 103 and collected in the filtered gas chamber 113, and it is then sent through the filtered gas outlet port 112 to the downstream of the plant. Regeneration of the filters by back-washing is carried out by injecting compressed air from back-washing nozzles 108 to increase the pressure in each filter tube 103 beyond the pressure of the dust-containing gas side space to let the gas flow backward along the filtration wall of the filter tubes 103.

As the dust-containing gas flows down outside the filter tubes 103, the gas will permeate through the wall of the filter tubes to the inside of the filter tubes 103, whereby the descending velocity of the dust-containing gas gradually decreases as the gas goes down and will be about zero at the lower ends of the filter tubes 103. On the other hand , the dust concentration in the dust-containing gas increases as the gas goes down, and the dust-concentration further increases as the descending velocity of the gas approaches zero. The thickness of the powdery dust layer accumulated on the outer walls of the filter tubes 103 sharply increases at this portion.

If the static pressure distribution in the filtration apparatus is uniform and if there is no fluctuation in the gas permeability among the filter tubes 103, the descending velocity of the dust-containing gas will be zero in the vicinity of the lower end of each filter tube, and at a position below this portion, the powdery dust will fall into the hopper 107 at the terminal velocity due to the gravity. However, like in the case of the above mentioned tubular filtration apparatus, in reality, the gas permeability is delicately different among the filter tubes 103, and the dust-containing gas stream may be descending or ascending at the lower portion of each filter tube 103. Fine powdery dust in the dust-containing gas will flow along with such a disordered gas stream, and its state changes every minutes.

In such a case, if the combustion state of the boiler is instable, and an abnormal combustion state occurs, a large amount of unburnt combustible powdery dust will be included in flue gas. As mentioned above, such unburnt combustible powdery dust usually has large particle size and a high specific gravity and thus tends to fall quickly into the hopper as compared with ash as the combustion residue. However, if its absolute amount increases, the amount of fine unburnt combustible powdery dust correspondingly increases, and fine combustible powdery dust tends to stay at the lower ends of the respective filter tubes.

If the oxygen concentration in the filtration apparatus will increase in such a state, it is likely that at the lower ends of the filter tubes 103 where the concentration of the dust is high, the powdery layer accumulated on the outer wall surface of the filter tubes or combustible powdery dust staying in the space in the vicinity thereof will be ignited, and combustion will start. If this state is maintained, abrupt combustion of the powdery dust layer accumulated on the surface of the filter tubes and of the combustible powder dust suspended in the vicinity thereof will take place.

However, if incombustible powder is present at this portion at a concentration higher than a certain level, the incombustible powder will hinder the heat conduction in the combustible powdery dust and will prevent propagation of the flames, whereby even if the combustible powdery dust is ignited, such combustion will be mild, and there is no such a danger that the combustion will spread over a wide range.

In the same manner as in the embodiment described with reference to FIG. 1, ignition and combustion of combustible powdery dust can be prevented by opening the valve 24a and the valve 25a during the period of mixed combustion or immediately before the emergency shut down of fuel, to introduce e.g. talc powder having a mean particle size of about 3 μm into the dust-containing gas stream at the gas inlet port 150, so that the concentration of the incombustible powder in the dust-containing gas side space in the filtration apparatus will be preferably at least 2500 g/m³, more preferably at least 3000 g/m³.

FIG. 5 is a vertical cross-sectional view illustrating an embodiment wherein the method for operating a filtration apparatus for flue gas according to the present invention is applied to a tubular type filtration apparatus (provided with a means for returning the dust-containing gas) for removing dust from flue gas of a PFBC boiler. In this embodiment, the construction is the same as in FIG. 1 except for the portion of the means for returning the dust-containing gas, and the description of the same portions as in FIG. 1 will be omitted, and the portion relating to the gas returning means will be described. Referring to FIG. 5, reference numeral 16 indicates a gas passage for returning the dust-containing gas from the hopper to the gas inlet chamber 6, which serves also as a filter tube, numeral 44 a gas passage made of a refractory alloy connecting tube which serves also as a prop for supporting an ejector 51, and the ejector 51 having a nozzle which constricts the flow path of the introduced flue gas to increase the flow velocity of the gas and to reduce the static pressure of the gas and being thus capable of producing a static pressure difference, whereby the dust-containing gas is suctioned and returned from the hopper 7.

Referring to FIG. 5, the dust-containing gas is introduced from the gas inlet port 8 and accelerated at the constricted portion of the nozzle of the ejector 51 to reduce the static pressure so that the dust-containing gas in the hopper 7 is suctioned through the gas passages 16 and 44. Then, the flow velocity (the kinetic energy) is converted to a static pressure at the diffuser portion of the ejector 51 to regain the static pressure, and the gas flows into the gas inlet chamber 6 under a static pressure higher by e.g. 1000 mmAq than at the constricted portion of the nozzle.

As the dust-containing gas flows down in each filter tube 3, the gas will permeate through the filter tube 3 to the outside of the filter tube. Accordingly, the descending velocity of the dust-containing gas gradually decreases, but it will flow into the hopper usually at a rate of from 30 to 1500 cm/sec by returning the dust-containing gas. In this case, the powdery dust layer will not be thickly accumulated even at the lower ends of the filter tubes 3, whereby it is possible to prevent the ignition of combustible powdery dust in the accumulated powdery dust layer, and combustion will not substantially propagate.

The dust-containing gas flowing into the gas passage 16, accompanied by fine powdery dust which can hardly be precipitated at the bottom of the hopper 7, is partly filtrated and enters into filtered gas chambers 9a, 9b and 9c, and the rest will be retuned through the gas passage 44 to the gas inlet chamber 6. In this case, a part of fine incombustible powder introduced into the gas inlet port 8, will not immediately fall down to the bottom of the hopper 7 and will be returned to the gas inlet chamber 6, whereby the concentration of the incombustible powder in the filtration apparatus 1 can be maintained at an effective concentration for a certain period of time.

Even when the period for mixed combustion of kerosine and coal is relatively long, if the incombustible powder is introduced into the filtration apparatus 1 immediately prior to the initiation of the mixed combustion, it is unnecessary to further introduce the incombustible powder during the period for the mixed combustion.

The invention has been described with reference to the above embodiments wherein the filtration apparatus is equipped with ceramics filters to remove dust from flue gas of a PFBC boiler. However, the method for operating a filtration apparatus for flue gas according to the present invention, can be applied effectively to reduce the dust from flue gas discharged from any burner not limited to the PFBC boiler, so long as it is a burner using mainly solid fuel. Further, it can be applied effectively to other types of filtration apparatus for high temperature gasses, such as an electrostatic precipitator, a bag filter, a louver separator, a cyclone separator and a multi-cyclone separator.

In the above embodiments, the incombustible powder is introduced to the upper stream of the filtration apparatus or in the vicinity of the gas inlet port. However, the incombustible powder may be introduced directly to the portion where ignition or combustion of combustible powdery dust is likely to take place, for example, to the hopper. In this case, if a filtration apparatus provided with a means for returning the dust-containing gas, is used, it is possible to distribute the incombustible powder not only to the hopper but widely to other portions in the filtration apparatus, and thus it is possible to maintain the effect for suppressing the combustion of combustible powdery dust for a certain period of time.

TEST EXAMPLES

FIG. 6 is a graph showing results of tests wherein combustible powdery dust (coal-dust and char) were intentionally generated at the time of removing dust from the flue gas of a PFBC boiler. The dust-removing tests were carried out by a filtration apparatus of the construction as shown in FIG. 1, wherein the temperature of the dust-containing gas was from 300 450° C. at the lower ends of the filter tubes, and the oxygen partial pressure was from 0.7 to 1.05 kg/cm².

The abscissa of the graph represents the dust concentration (the amount of the powdery dust per unit volume) of the combustible powdery dust introduced into the tubular filtration apparatus. The incombustible powder introduced was talc powder having a mean particle size of about 3 µm. The ordinate represents the mean concentration (per a unit volume of the dust-containing gas side space) of the talc powder suspended in the dust-containing side space of this filtration apparatus. The black spots indicate Test Examples wherein an abrupt temperature rise occurred due to combustion of the combustible powdery dust, and white spots indicate Test Examples wherein no substantial temperature rise was observed.

The dust concentration in flue gas discharged from a PFBC boiler is usually from 30 to 60 g/m$^3$ at the maximum (i.e. in a state where a cyclone provided as a preliminary filtration apparatus at the upper stream of the filtration apparatus equipped with ceramics filter, does not function). The above test was carried out on the basis that the entire amount of the dust is composed of combustible powdery dust. As a result, it has been found that in the case where a talc powder having an average particle size of 3 µm is introduced, ignition of the combustible powdery dust can substantially be prevented by suspending at least 1500 g/m$^3$ of the talc powder in the filtration apparatus.

Also in the cases where other different incombustible powders are introduced, it has been found that they are all effective for suppressing combustion of combustible powdery dust although the degree in their effects i.e the amount of the incombustible powder to be introduced, is different.

When the method for operating a filtration apparatus for flue gas according to the present invention, is used for removing dust from flue gas from a burner such as a diffuse incinerator or a burner in which combustion is carried out under a pressurized condition, such as a PFBC boiler or a coal direct firing burner, the filtration apparatus can be operated reliably and safely even in such a transitional operation state that a trouble of thermal damage of parts in the filtration apparatus used to be hardly avoided. It is thereby possible to substantially quicken the realization of a power plant operated by the PFBC boiler, to which expectation of the world is directed. Thus, the industrial value of the present invention in the energy industry is substantial.

What is claimed is:

1. A method for operating a filtration apparatus for flue gas, which comprises removing dust from flue gas discharged from a burner using mainly solid flue, said dust-containing flue gas being at a pressure of at least 3 atmospheres, which comprises:

a) introducing incombustible powder by means of injected compressed gas into the filtration apparatus upon detecting arrival of unburned combustible duct from the burner, or upon detecting an increase in flue gas temperature; and b) suspending said incombustible powder in the dust-containing flue gas to suppress combustion of the combustible dust or to suppress said increase in flue gas temperature, in said filtration apparatus.

2. The method for operating a filtration apparatus for flue gas according to claim 1, wherein the incombustible powder is endothermically heat-decomposable.

3. The method for operating a filtration apparatus for flue gas according to claim 1, wherein the incombustible powder is at least one member selected from the group consisting of calcium carbonate, calcium hydroxide, calcium sulfate, magnesium carbonate, magnesium hydroxide, magnesia, aluminum hydroxide, alumina, talc, clay, gypsum, ammonium phosphate, ammonium hydrogenphosphate, calcium hydrogenphosphate, boric acid, melamine phosphate, fly ash and diatomaceous earth.

4. The method for operating a filtration apparatus for flue gas according to claim 1, wherein the amount of the incombustible powder introduced by one introduction operation is from 1500 to 5000 g per 1 m$^3$ of the flue gas side space containing the dust, in the filtration apparatus.

5. The method for operating a filtration apparatus for flue gas according to claim 1, wherein the mean particle size of the incombustible powder is from 2 to 44 µm.

6. The method for operating a filtration apparatus for flue gas according to claim 1, wherein the filtration apparatus used, is equipped with ceramic filters.

7. The method for operating a filtration apparatus for flue gas according to claim 1, wherein dust-containing gas having a relatively high concentration of dust is withdrawn from the downstream of the filtration apparatus and returned to a vicinity of a gas inlet port of the filtration apparatus.

8. The method for operating a filtration apparatus for flue gas according to claim 1, wherein the burner is a pressurized fluidized bed combustion boiler.

9. The method for operating a filtration apparatus for flue gas according to claim 4, wherein the amount of the incombustible powder introduced for one operation is from 2,000 to 4,500 g per 1m$_3$ of the space on the dust-containing gas side in the filtration apparatus.

10. The method for operating a filtration apparatus for flue gas according to claim 5, wherein the mean particle size of the incombustible powder is from 3 to 20 µm.

11. The method for operating a filtration apparatus for flue gas according to claim 5, wherein the mean particle size of the incombustible powder is not more than 10 µm.

12. The method for operating a filtration apparatus for flue gas according to claim 11, wherein the mean particle size of the incombustible powder is not more than 5 µm.

\* \* \* \* \*